(12) United States Patent
Jansen

(10) Patent No.: US 8,950,425 B1
(45) Date of Patent: Feb. 10, 2015

(54) COMBINING VALVE WITH FUEL RELIEF AND SEALING

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 1271 days.

(21) Appl. No.: 12/351,537

(22) Filed: Jan. 9, 2009

Related U.S. Application Data

(60) Provisional application No. 61/020,594, filed on Jan. 11, 2008.

(51) Int. Cl.
*F16K 49/00* (2006.01)

(52) U.S. Cl.
USPC ........ 137/340; 137/240; 137/597; 60/39.094; 60/741

(58) Field of Classification Search
CPC ...................................................... F02C 7/232
USPC .............. 60/39.094, 39.1, 741; 137/111, 112, 137/113, 240, 340, 597, 102, 109, 118.07, 137/312, 587, 596, 625.48, 883
See application file for complete search history.

(56) References Cited

U.S. PATENT DOCUMENTS

| 4,041,695 | A | | 8/1977 | Harper et al. | |
|---|---|---|---|---|---|
| 4,655,253 | A | * | 4/1987 | Ourensma | 137/614.18 |
| 5,528,897 | A | * | 6/1996 | Halin | 60/39.094 |
| 5,809,771 | A | * | 9/1998 | Wernberg | 60/39.094 |
| 6,050,081 | A | | 4/2000 | Jansen et al. | |
| 6,244,291 | B1 | * | 6/2001 | Hughes | 137/312 |
| 6,378,958 | B1 | * | 4/2002 | Batchelor | 303/115.4 |
| 6,619,025 | B2 | * | 9/2003 | Wernberg | 60/39.094 |
| 6,729,135 | B1 | | 5/2004 | Norris et al. | |
| 6,751,939 | B2 | | 6/2004 | Futa, Jr. et al. | |
| 6,892,544 | B2 | | 5/2005 | Futa, Jr. et al. | |
| 6,931,831 | B2 | | 8/2005 | Jansen | |
| 7,155,896 | B2 | | 1/2007 | Jansen et al. | |
| 2005/0097880 | A1 | | 5/2005 | Jansen | |
| 2006/0042701 | A1 | * | 3/2006 | Jansen | 137/606 |
| 2006/0070655 | A1 | * | 4/2006 | Tebby | 137/112 |

* cited by examiner

*Primary Examiner* — Kevin Murphy
(74) *Attorney, Agent, or Firm* — Quarles & Brady LLP

(57) ABSTRACT

A combined fuel and purge air valve for a turbine engine has an onboard residual fuel reservoir to relieve pressure transients in the fuel circuit during purge air mode operation. The fuel reservoir also operates to effectively seal the fuel circuit with fuel present in the valve chamber by venting any purge air that should happen to leak past the primary seals. A 3-way spool valve controls the transition between start-up and sustained fuel operation modes as well as the purge air operation mode. A movable shuttle controls the communication of the fuel circuit with the fuel reservoir and ensures that the fuel reservoir is open in the purge air mode and closed off in the fuel modes. Pilot air activates the shuttle and spool valve and fuel pressure provides biasing forces. Fuel is distributed through an array of outlet ports, and the valve is cooled by an integral coolant jacket.

20 Claims, 6 Drawing Sheets

COMBINING VALVE WITH FUEL RELIEF AND SEALING

CROSS-REFERENCE TO RELATED APPLICATION

This application claims benefit to U.S. provisional application Ser. No. 61/020,594 filed Jan. 11, 2008.

STATEMENT OF FEDERALLY SPONSORED RESEARCH OR DEVELOPMENT

Not applicable.

BACKGROUND OF THE INVENTION

1. Technical Field

The present invention relates to fuel delivery systems gas turbine engines, and in particular to combined liquid fuel and purge air valves for turbine engines.

2. Description of the Related Art

Gas turbine engines have a set of rotating turbine blades that compress air leading to a combustion chamber into which fuel is injected and ignited. Fuel is delivered through metering orifices to burners in the combustion chambers under pressure through fuel lines. Combustion of the fuel turns a downstream set of blades from which energy is extracted and which can also be used to drive the compressor blades. Gas turbines used in power generation have large diameter blades and an array of combustion cans each with several burner nozzles that ignite the fuel at light-off and sustain combustion during operation. Many of these are dual fuel turbines (e.g., F-Class gas turbines) in which sustained operation can be achieved by burning either a liquid or a gaseous fuel. Diesel and heavy distillate fuel oils are common liquid fuels in power generation applications.

The combustion cans of the turbine engine are high pressure and temperature environments. It is typical for the environment surrounding the combustion cans to reach temperatures of 400° F., and for the combustion chamber temperature to near 2,000° F. The liquid fuel is consumed at a rate of about 20 gallons per minute at a high fuel pressure of about 1200 psig. This extreme environment is very hard on the fuel control components of the turbine fuel system, particularly for dual fuel turbines in which the during sustained gaseous burn, the liquid fuel system remains inoperable for long periods of time. The primary concern is the formation of the coke, or the tarry deposits left after the distillate or volatile components of the fuel are driven off by heat, on the metering orifices and other working surfaces of the liquid fuel control components. Coke deposits arise primarily from the presence of residual fuel left in the fuel atomizer, burner nozzles, control valves, fuel manifolds and other components subjected to the high heat of combustion. Residual liquid fuel left in the liquid fuel control components during gaseous operation will begin to coke at temperatures of about 250-280° F. in the presence of oxygen, which are well under the combustion temperature.

To evacuate the residual fuel, the fuel valves, burner nozzles and other components are purged with purge air bled from the turbine compressors or from an independent source. While the purge air coming from the compressors is hot, it is cooler than the combustion chamber temperatures so that it also cools the burner nozzles. Thus, air purging is necessary to prevent the burner nozzles from being damaged as well as to ensure that the system orifices and valves are clear of such deposits which could inhibit proper conduit of the fuel when the engine is returned to fuel mode.

In order to permit purging, a purging air line must join with the fuel line. It is important that the fueling and purging operations be isolated so that fuel does not go down the air purge line and hot gases do not travel up the fuel line to the fuel supply. Check valves are often installed in each of these lines to prevent this, thereby complicating the assembly and creating additional locations for coking to occur. And, common spring-loaded checks may be unreliable, sticking in the open position or allowing some backwash into either of the fuel or purge lines. Alternatively, the fuel cut-off valve may be operated by a pneumatic actuator in line with the check valve of the fuel line, however, this is also subject to coking and may introduce substantial pressure drops in the fuel flow. The fuel cut-off valve also introduces a potential failure point to the turbine where, if pressure is lost to the pneumatic actuator, the turbine will cease operating.

An effective three-way purge valve is disclosed in U.S. Pat. No. 6,050,081, assigned to the assigned of the present invention and hereby incorporated by reference as though fully set forth herein. That valve has a spool valve that shuttles between positions alternatively blocking the combustion can(s) from either the purge air line or the fuel line. The spool is biased to close off the fuel line and is urged to open the fuel line by a pilot air actuated piston. Thus, when fuel is to be closed off from the engine, the spool valve will return to its initial position thereby allowing the burner nozzles and the downstream side of the spool to be purged to reduce or eliminate coking in these areas.

Even with good air purging, coking can still be a problem. Not all of the components in the fuel system subjected to high temperatures, for example fuel check and cut-off valves, are often not able to be purged because they may be providing the barrier between the fuel and air streams. And, even those components that are air purged, some amount of residual liquid fuel may remain in the small internal chambers and passageways of the valves or other components of the fuel system. Moreover, since the air purge control valves may themselves be located at or near the combustion cans, they too are subject to the adverse affects of coking.

To further reduce the effects of coking, U.S. Pat. No. 6,729,135 discloses a system and method of circulating the liquid fuel through a heat exchanger to cool the temperature of the liquid fuel distillate during operation of the turbine in gaseous fuel mode. Coking is thus reduced in large part by keeping much of the liquid fuel distillate temperature below the coking threshold temperature. However, this system requires a heat exchanger and either a separate fuel recirculation pump or increased duty on the main fuel pump. Moreover, because the recirculation lines carry liquid fuel, these lines, along with any recirculation control components, present yet another location for coking to occur when the recirculation system is not operating. To avoid this, during liquid fuel operation some of the liquid fuel must be made to bypass the combustor to flow through the recirculation system. Intermittent operation of the recirculation system is also possible, but only to the extend that sufficiently cool fuel temperatures can be maintained.

U.S. Pat. No. 6,931,831 discloses an improved distributor purge valve that combines in one unit the pilot air, fuel metering, purging, and distributing components of the fuel system, and reduces coking problems by eliminating components where residual fuel can remain and by more effective use of the purge air within the valve. And, U.S. patent publication No. 2005/0097880 discloses such an combined valve construction with an integral water jacket containing coolant for cooling critical components where residual fuel may reside. Both U.S. Pat. No. 6,931,831 and the published application 2005/0097880 are hereby incorporated in their entirety by reference as though fully set forth herein.

While these more recent developments address the coking problem, there still remains the issue of the fuel system being compromised by the effects of the harsh environment and even the purge air itself. Specifically, for one thing, because of the close proximity of the fuel and purge air circuits, there is the possibility for leakage of the pressurized purge air into the fuel system. This can adversely affect the upstream fuel components as well as cause air pockets in the fuel that can disrupt performance of the engine and cause a lag in transitioning to fuel operation mode. Another problem is that the pressure of the fuel left inside the valve during purge mode operation can fluctuate due to thermal expansion or contraction, thereby creating a high pressure situation that must be relieved or a reduction available fuel in the valve, which leads to the type of issues described above regarding air being present in the fuel lines.

Accordingly, an improved fuel and purge valve arrangement is needed.

SUMMARY OF THE INVENTION

The present invention provides a valve for use in gas turbine engines having an arrangement for adapting for pressure changes within the fuel circuit as well as preventing air or other such non-fuel media from being trapped within the fuel circuit, thereby effectively sealing the fuel circuit. The valve can be advantageously used as a combined fuel and purge air valve in which during purge air mode operation, high pressure and purge air contamination of the fuel circuit can be accommodated and vented through a fuel reservoir without an air pocket between the valve and the fuel.

In one aspect the invention provides a valve for controlling the flow of liquid fuel in a gas turbine fuel system. The valve includes a valve housing defining a fuel flow path including a valve chamber, a fuel inlet and a fuel outlet. The valve housing also defines a fuel reservoir in communication with the valve chamber via an internal passageway. A spool valve is disposed in the valve chamber such that in a closed position the spool valve disrupts the flow of fuel from the fuel inlet to the fuel outlet. A shuttle, disposed in the valve chamber and movable with respect to the spool valve, is configured to open communication between the valve chamber and the internal passageway to the fuel reservoir when the valve member is in the closed position and to shut-off communication between the valve chamber and the internal passageway when the valve member is in an open position in which fuel can flow from the fuel inlet to the fuel outlet.

In another aspect the invention provides a valve for controlling the flow of liquid fuel and purge air in a gas turbine fuel system. A valve housing defines a fuel circuit and a purge air circuit. A first seal is disposed in the fuel circuit, and a second seal is disposed in the purge air circuit spaced from the first seal. A valve member disposed in the valve housing is operable to seat against each of the first and second seals. In a closed position the valve member seats against the first seal, and in an open position the valve member seats against the second seal. A fuel reservoir communicates with the fuel circuit, and a shut-off member disposed in the valve housing is operable to shut-off communication between the fuel reservoir and the first seal when the valve member is in the open position.

In yet another aspect the invention provides a combined fuel and purge air distributor valve for a gas turbine. A valve housing defines a fuel circuit, a coolant circuit, a purge air circuit and a distributor section having a plurality of outlet ports. The valve housing also defines a fuel reservoir in communication with fuel circuit. A first seal is disposed in the fuel circuit, and a second seal is disposed in the purge air circuit spaced from the first seal. A valve member disposed in the valve housing is operable to seat against each of the first and second seals. In a closed position the valve member seats against the first seal to close off communication of the fuel circuit to the outlet ports, and in an open position the valve member seats against the second seal to close off flow of the purge air circuit to the outlet ports. A shut-off member disposed in the valve housing is operable to shut-off communication between the fuel reservoir and the first seal when the valve member is in the open position.

In other aspects the valve can be actively cooled. The valve housing can define a cooling circuit between for circulating coolant of lesser temperature than the fuel within the fuel circuit in the valve housing. The fuel reservoir can be formed integrally within the valve housing in close proximity to the coolant circuit and is vented to ambient through an external collection tank. The shut-off member or shuttle can be movable relative to the valve member, and activation of both can be initiated by pilot air. The shuttle can be a sleeve disposed about the valve member having an annular seal for closing off the passageway to the fuel reservoir and having at least one orifice for fuel within the valve chamber to flow to the valve member.

With the present invention, better performing valves of various constructions can be used in the extreme environment of a combustion area of a gas turbine engine to accomplish various objectives. In a preferred 3-way combined metering/purge distributor valve construction, the fuel and purge air circuits, preferably share one or more passageways and the outlet ports leading to the combustor(s) while the valve member isolates the air flow form the fuel flow so that these streams do not mix. The valve thus can be operated to meter fuel to the burner nozzles during sustained liquid fuel operation and alternatively to purge the downstream fuel lines and burners with air to cool them and extricate residual liquid fuel to prevent coking during shut down and gaseous fuel operation of the turbine.

The on-board fuel reservoir operates to effectively seal the fuel circuit with fuel present in the valve chamber by venting any purge air that should happen to leak past the primary seals. A 3-way spool valve controls the transition between start-up and sustained fuel operation modes as well as the purge air operation mode. The movable shuttle controls the communication of the fuel circuit with the fuel reservoir and ensures that the fuel reservoir is open in the purge air mode and closed off in the fuel modes. The fuel reservoir adapts for pressure changes within the fuel circuit and prevents air pockets within the fuel circuit such that during purge air mode operation, high pressure and purge air contamination of the fuel circuit can be vented through the fuel reservoir. Fuel can remain filled in the valve chamber so that rapid, controlled transition to fuel operation can be achieved in an emergency or at routine engine start-up. Pilot air activates the shuttle and spool valve and can remain present during fuel mode operation. The fuel pressure works to fully open the valve member and also acts as a failsafe to bias the shut-off member or shuttle should the pilot air system be compromised. Finally, the valve is cooled by an integral coolant jacket to provide more consistent operation and reduce coking.

These and still other advantages of the invention will be apparent from the detailed description and drawings. What follows is a detailed description of the disclosure. To assess the full scope of the invention the claims should be looked to as the details described are not the only constructions within the scope of the invention.

DETAILED DESCRIPTION OF THE DISCLOSURE

Figure 1:
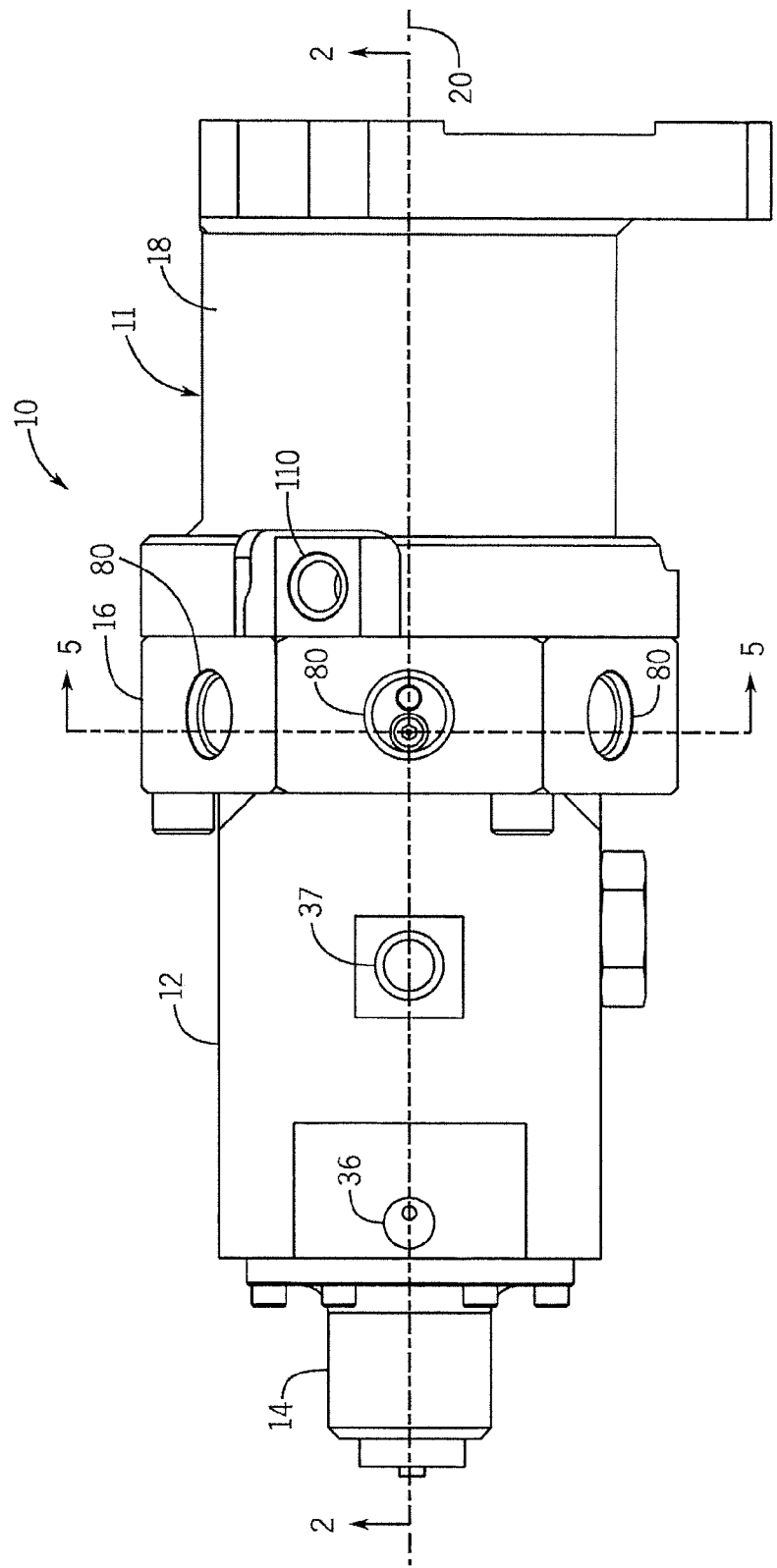
FIG. 1 is a top plan view of a combining valve for a turbine engine according to the present invention.

FIG. 1 shows the exterior of one version of a combining valve unit 10 according to the present invention. The valve unit 10 has a valve housing 11 with a central fuel section 12 with a pilot air section 14 mounted to one end and a distributor section 16 mounted to the opposite end to which is mounted a purge air section 18. These sectional components are assembled in any suitable permanent or dismountable manner, such as welding, bolts or the like, with suitable annular seals between the mating parts, and all generally lie along a spool axis 20. The valve unit 10 can be coupled by lines, or mounted directly to, a combustion can (not shown) of a gas turbine engine (not shown) generally in the orientation shown in FIG. 2.

Figure 2:
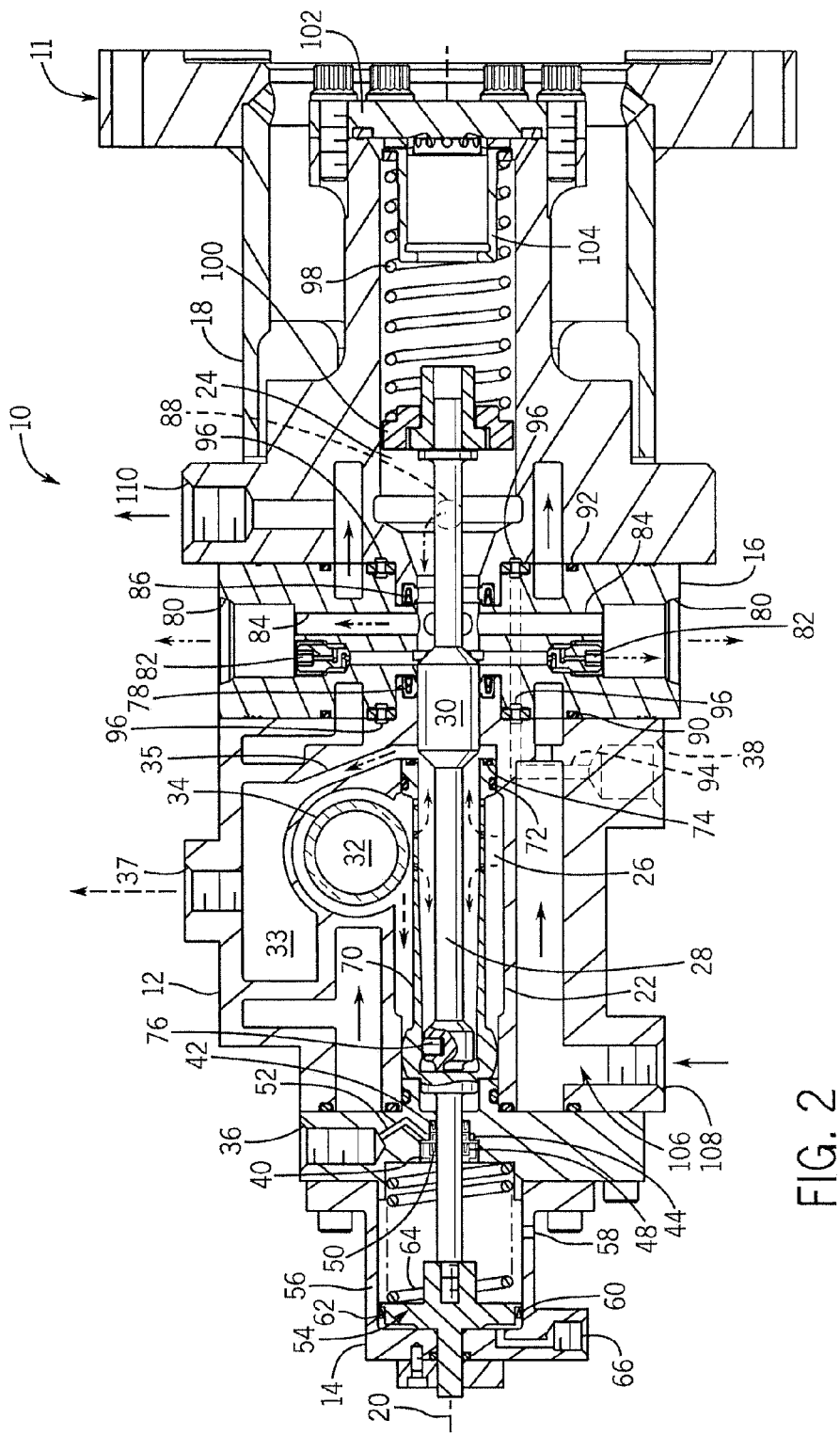
FIG. 2 is a cross-sectional view taken along line 2-2 of FIG. 1, showing the valve in closed position for purge air mode operation.

Referring to FIG. 2, the fuel section 12, distributor section 16 and purge air section 18 define a central valve or spool chamber 22, having an air only area 24 and a fuel only area 26, concentric with the spool axis 20 in which an elongated spool member 28 is disposed. The spool 28 is movable along the spool axis 20 during operation of the valve 10 to position an enlarged cylindrical valve section 30 of the spool 28 as needed to control fuel and purge air flow through the valve 10 as will be described below.

The fuel section 12 has a fuel inlet 32 in communication with the fuel only area 26 of the spool chamber 22 and having a port (not shown) receiving a fitting (not shown) connecting a fuel line (not shown) leading from a source of pressurized fuel, typically from a fuel pump (not shown) that may be separately activated when fuel is required for the turbine. The fuel inlet 32 includes a removable strainer 34 to collect particles and other impurities in the inflowing fuel, which can be accessed for cleaning as needed. The fuel section 12 has a residual fuel reservoir 33 located at its upper portion as oriented in FIG. 2 and an internal passageway 35 between the spool chamber 22 and the fuel reservoir 33. The fuel reservoir 33 is vented at the top by a vent port 37 which can be coupled to a vent line (not shown) connected to an external collector tank (not shown) vented to ambient.

The fuel section 12 also has two interstitial vents 36 and 38 that receive fittings (not shown) for connecting vent lines (not shown). Interstitial vent 36 disposes of any fuel that may leak from the fuel section 12 to the pilot air section 14. Interstitial vent 38 disposes of any fuel or purge air that may leak from distributor 16 or purge air 18 sections of the valve 10. The fuel section 12 has a pocket 40 at the end where the pilot air section 14 attaches that receives a primary annular seal 42, an intermediate seal retainer 44 having an internal vent passageway and a back up annular seal 48, all of which is secured in the pocket 40 by a threaded retainer 50. Any fuel leaking past the primary seal 42 will be blocked by the back up seal 48 and directed out of the valve 10 through the interstitial vent 36 via an internal passageway 52.

The primary 42 and back up 48 seals seat against the circumference of the stem of an actuator piston 54 that moves within a piston chamber 56, which is vented to ambient by open vent port 58 of the pilot air section 14, along the spool axis 20. The actuator piston 54 has an enlarged head 60 carrying a piston seal 62 that is biased by a spring 64 within the piston chamber 56 away from the fuel section 12. The actuator piston 54 moves against the spring 64 by pressurized pilot air coming from a line coupled to a pilot air inlet port 66 and routed through passageway 68 to the piston chamber 56. Movement of the actuator piston 54 initiates movement of the spool 28 as well as an annular sleeve-like shuttle shut-off member 70, as will be described. The shuttle 70, which has an enlarged head carrying an circumferential seal 72 and a face seal 74 for mating with the spool chamber 22, has an array of apertures (not shown) spaced about its circumference to permit fuel flow therethrough. The piston stem is fixedly mounted to the shuttle 70, however, the end of the spool 28 can move relative to the shuttle 70, riding on pins 76 (one shown) mounted to the end of the spool 28, which are crowned and made of high temperature resistant material, such as Vespel®, to prevent galling of the shuttle 70.

Figure 5:
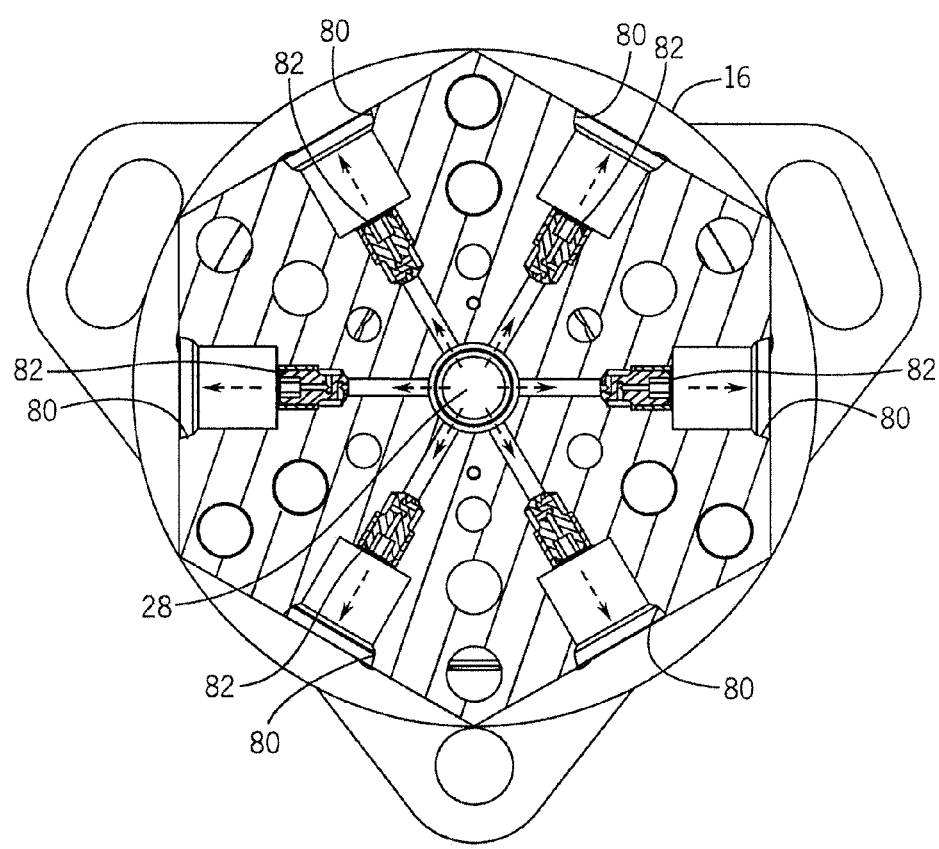
FIG. 5 is a sectional view taken along line 5-5 of FIG. 1 showing an array of fuel/purge air outlet ports in a distributor section of the valve.

The distributor section 16 mounts over a pocket at the end of the fuel section 12 opposite the pilot air section 14. The pocket contains a first annular seal 78 sized to seal against the valve section 30 of the spool 28. As shown in FIG. 5, the distributor section 16 is a hexagonal body defining six outlet ports 80 that receive fittings coupling individual fuel lines (not shown) leading to each of the burners in the combustion can of the turbine. Note that any number of outlet ports could be provided to match the number of burners in the turbine. The first annular seal 78 thus seals the fuel inlet 32 from the outlet ports 80 (and thereby the combustion chamber of the turbine) when the spool 28 is in the closed position shown in FIG. 2. Each of the six outlet ports 80 is fed by two parallel channel, one of which includes a threaded fill nozzle insert 82 and the other being a main outlet orifice 84. Each fill nozzle insert 82 is located in the channel upstream (closer to the fuel inlet 32) from the associated outlet orifice 84. The outlet orifices 84 have a larger diameter bore and act as the primary orifices for fueling, while the smaller bore fill nozzles 82 are used primarily to prime the fuel lines and burners during turbine start up.

U.S. Pat. No. 6,931,831, which is assigned to the assignee of the present invention, provides a detailed description of a non-cooled combined purge air and distributor valve, albeit with fuel recirculation, for a dual fuel gas turbine. The entire disclosure of which is hereby incorporated by reference as though fully set forth herein.

The purge air section 18 mounts onto the side of the distributor section 16 opposite the fuel section 12 and has an end that defines a pocket for a second annular seal 86 sealing against the valve section 30 of the spool 28. The second annular seal 86 is identical to the first annular seal 78, being disposed about the spool axis 20 and having the same internal diameter. The second annular seal 86 is at the air only 24 side of the spool chamber 22 and thus works to seal the a purge air inlet port 88 from the outlet ports 80. These seals 78 and 86 cooperate with the valve section 30 of the spool 28 to control the separate flows of fuel and purge air to the combustion can of the turbine and isolate the fuel from the purge air within the valve 10. More specifically, the cylindrical valve section 30 of the spool 28 is essentially equal in diameter to the internal diameter of the seals 78 and 86 so as to prevent flow through the seals 78 and 86 when the valve section 30 is within either or both of the seals 78 and 86. The valve section 30 extends along the spool axis 20 a distance greater than the separation between the seals 78 and 86 so that both seals 78 and 86 may be blocked simultaneously and at no time is more than one seal 78 or 86 open.

Annular face seals 90 and 92 are disposed between the mating surfaces of the distributor section 16 and the fuel section 12 and the distributor section 16 and the purge air section 18, respectively, to prevent external leakage between these adjoining sections. Internal porting 94 joins annular grooves 96 adjacent each face seal 90 and 92 to the interstitial vent 38 so that any fuel or purge air leakage can be safely carried away from the valve 10.

The purge air section 18 includes the purge air inlet port 88 in communication with the air only area 24 of the spool chamber 22 and receives a fitting (not shown) coupling an air line (not shown) leading from a compressor stage of the turbine, which provides a source of hot air (400° Fahrenheit). A compression spring 98 abuts a retaining disk 100 having a hole in which fits an end of the spool 28 so that the spring 98 can bias the spool 28 toward the fuel section 12 to close the seal 78 and to press the opposite end of the spool 28 against the end of the shuttle 70. A sealed end cap 102 threaded into an open end of the purge air section 18 backs the spring 94 and a central stop 104 against which the retaining disk 100 bottoms when the spool 28 is in the fully open position shown in FIG. 6.

The valve housing 11 defines a water jacket 106 in which internal fluid passages run through the fuel section 12, distributor section 16 and purge air section 18 near critical areas and components of the valve 10. In particular, the passages of the water jacket 106 extend between coolant inlet 108 and outlet 110 ports. Notably, the passages extend annularly about the spool chamber 22 to cool the components (especially spool 28, shuttle 70 and seals 78 and 86) and media therein as well as beneath and around the fuel reservoir 33 to cool the residual fuel. It should be noted that the water jacket 106 can contain water or another suitable coolant in fluid or gaseous state.

With reference to FIGS. 2-4 and 6, the operation of the valve 10 will now be explained in detail. As shown in FIG. 2, prior to pressurization of the fuel by the fuel pump to pass fuel through fuel inlet 32 or after fuel pressure has stopped when it is desired to shut down the turbine, the spool 28 is biased to fully block seal 78 to prevent fuel from reaching the distributor outlets, while fully opening seal 86. In addition, in this closed position the valve section 30 of the spool 28 and the shuttle 70 are positioned to permit communication between the spool chamber 22 and the fuel reservoir 33 via the internal passageway 35. Biasing force is provided by the spring 98 in the purge air section 18, but also by the pressure exerted on the spool valve section 30 by the purging air through purge air inlet 88. This arrangement allows the valve 10 to exhibit a positive shut off of the fuel.

In this position of the spool 28, the hot purge air can be forced though the valve 10, particularly, from the purge air inlet 88 and into the air only area 24 of the spool chamber 22 and through the fill nozzles 82 and the outlet orifices 84 of the distributor section 16, then onto to the burners in the combustion can of the turbine via the associated lines. The purge air works to prevent coking in the air only section 24 of the valve 10, and in particular at the downstream side of the valve section 30 of the spool 28, as well as lines and orifices downstream from the valve 10. Importantly, it also serves to cool the burners in the combustion can, since while the purge air is hot at about 400° F., it is significantly cooler than the temperatures realized during combustion, which near 2,000° F. The purge air is pressurized, for example to nearly 300 psig and flows at about 0.05 lbs/sec.

Also when the spool 28 is in this closed to fuel position, any leakage of purge air passed the seal 78 is routed to the bottom of the fuel reservoir 33 via the internal passageway 35. The leakage of purge air will be small even if the seal 78 is damaged because of the close clearance between the spool 28 and the adjacent are of the bore defining the spool chamber 22. Because the fuel reservoir 33 is positioned to be at the valve 10 high point, the purge air leakage will migrate to the top and exit thru the vent port 37, collected at an external central location and finally vented to the ambient air. Since the fuel reservoir 33 and internal passageway 35 are water cooled, the leaked purge air will exit safely through the vent port 37. In this manner, the leakage of purge air passed the seal 78 will be at ambient pressure, cooled by coolant, passed through the ambient vent and not migrate into the remainder of the fuel system.

Moreover, when the spool 28 is in the aforementioned closed positioned, the liquid fuel captured between the spool 28 and the stop valve will expand as the turbine engine continues to operate on gaseous fuel. This thermal expansion is sufficiently large such that it could move the spool 28 to a position that restricts the flow of purge air essential for cooling of the liquid fuel atomizers in the combustion chambers while operating with gaseous fuel. To have the purge air flow restricted in this operating mode is undesirable since the liquid fuel atomizers will likely be damaged. However, in the present valve 10 the thermally expanding fuel is routed via the internal passageway 35 from the spool chamber 22 to the fuel reservoir 33, which is sized and hold a fuel volume that accommodate the fuel volume change. The residual fuel remains below the coking threshold temperature since the fuel reservoir 33 is cooled. It should also be noted that during some operating conditions the temperature of the fuel can decrease resulting in the contraction of the fuel. With the fuel reservoir 33 in constant communication with the trapped volume of fuel, when the fuel contracts, the fuel within the fuel reservoir 33 will flow back into the spool chamber 22 to prevent undesirable voids or pockets of air in the fuel circuit.

Thus, this arrangement for thermal relief keeps fuel present in the fuel reservoir 33, internal passageway 35 and fuel only area 26 of the spool chamber 22. By keeping these valve passages full of fuel without generating the possibility of air bubbles or fuel voids and will assure that the transfers from gaseous to liquid fuel and back are smooth. Also, these transfers can be accomplished in a rapid fashion upon the loss of gaseous fuel pressure.

Figure 3:
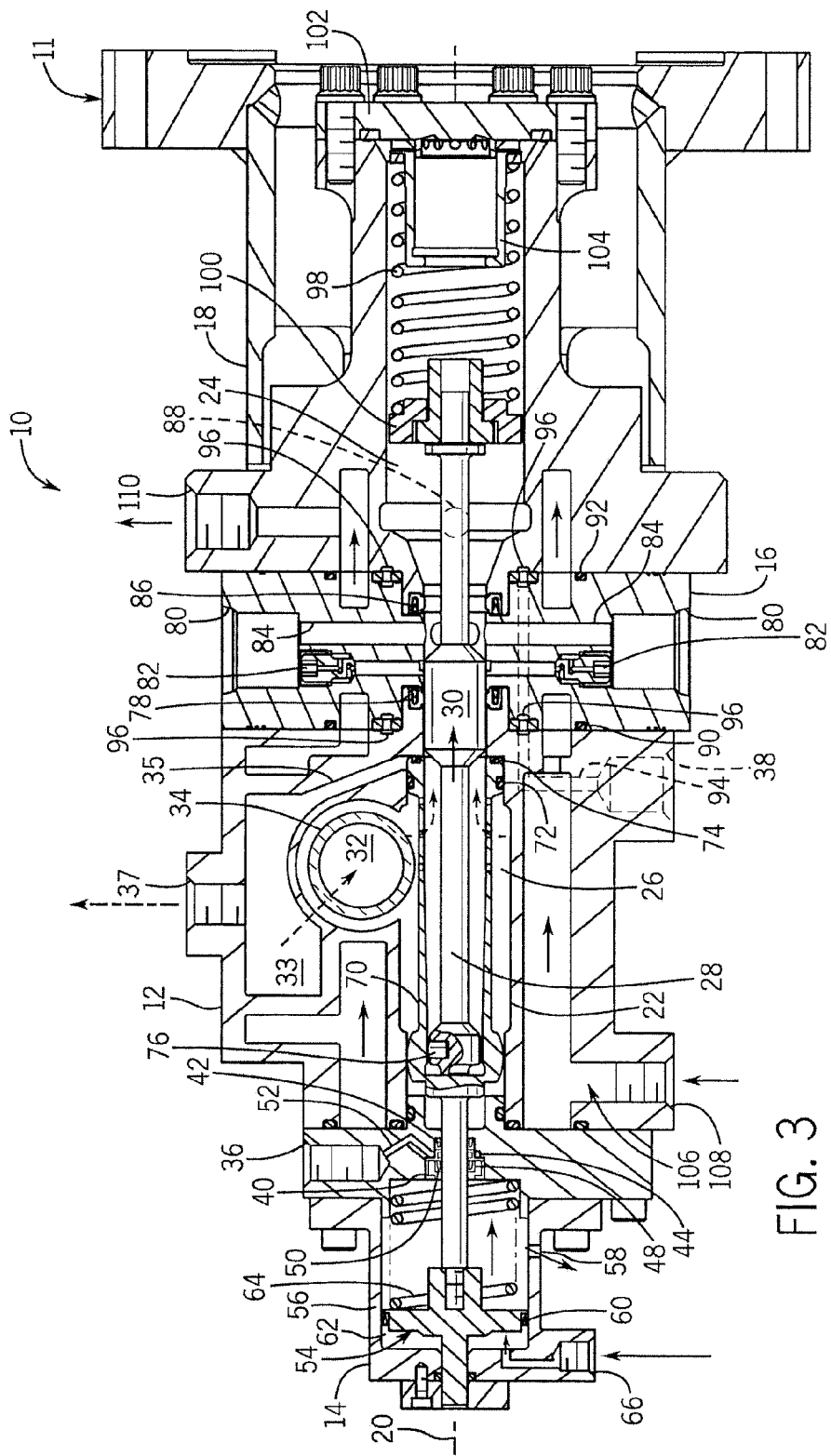
FIG. 3 is a similar sectional view showing a shut-off shuttle in position to close off communication of a fuel reservoir to a valve chamber of the valve at the beginning of fuel mode operation.
Figure 4:
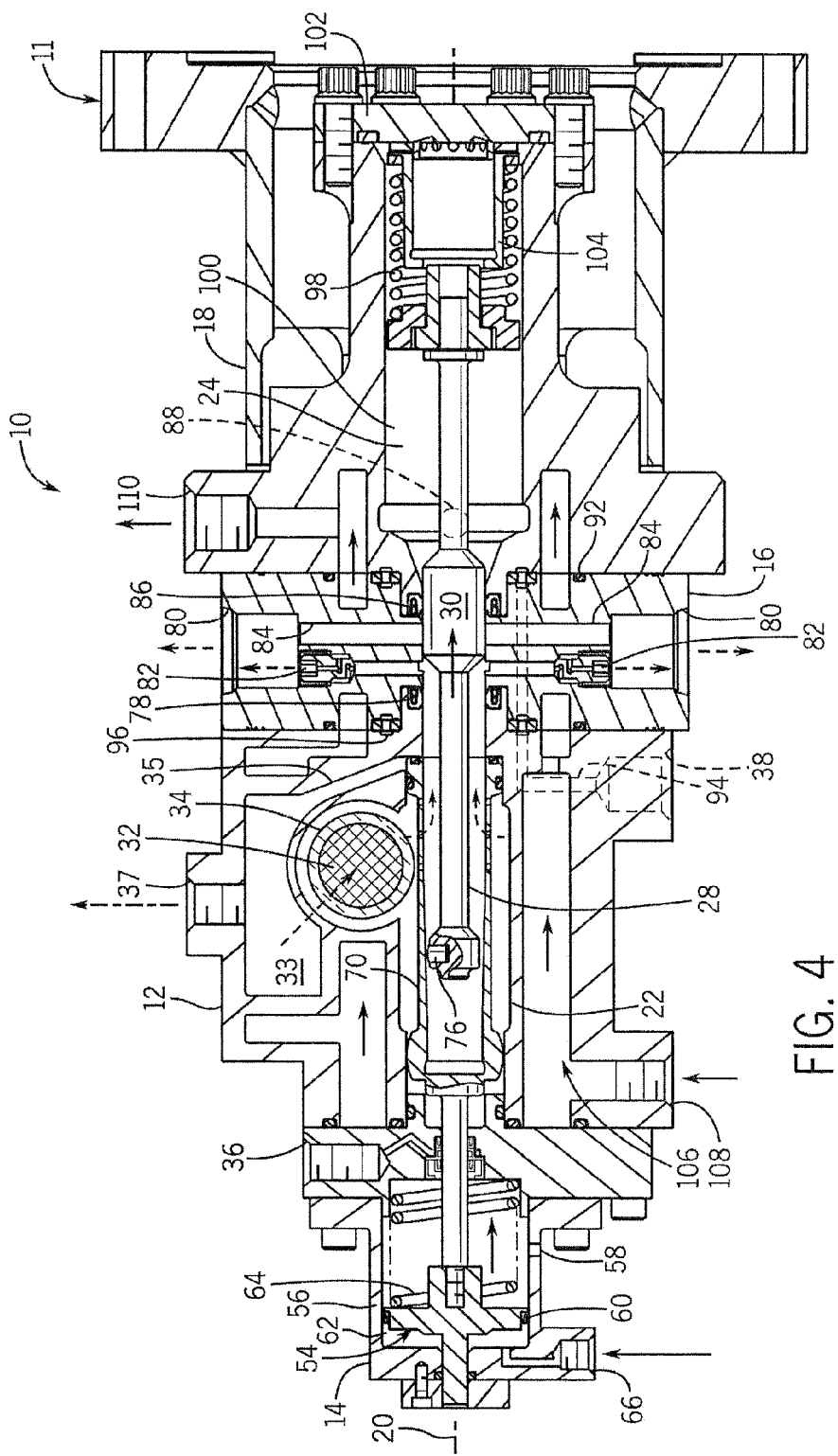
FIG. 4 is a similar sectional view showing the valve in a first open position for fuel mode operation at engine start-up.

As shown in FIGS. 3 and 4, at turbine startup, the actuator piston 54 is moved against spring 64 along the spool axis 20 toward the fuel section 12 by pressurized pilot air, preferably nearly 95 psig and up to about 300° F., acting on the large area of the actuator piston to move the shuttle 70 and the spool 28 toward the air only area 26 of the spool chamber 20. As shown in FIG. 3, the pilot air will move the shuttle 70 until it's circumferential 72 and face 74 seals close of the internal passageway 33 leading to the fuel reservoir 33. The shuttle 70 will then be held from further movement, but will continue to be biased by the pilot air. As shown in FIG. 4, the pressure of the fuel will continue to move the spool 28 so as to open the seal 78 against the biasing force of spring 98, and any anticipated pressure of the purging air and any frictional forces caused by minor coking of the spool 28. Friction from small amounts of coking on the valve section 30 are accommodated by the positive action of the spring and the pressurized purging air. The valve section 30 moves sufficiently away from seal 78 to provide an extremely low pressure drop across this junction. Again, because of the length of the valve section 30 of the spool 28, the fuel cannot begin to flow until the purging air through seal 86 has been completely shut off, thus ensuring no gross cross-contamination of fuel and purge air.

The spool 28 will initially move to the intermediate position shown in FIG. 4 in which the valve section 30 of the spool 28 moves off of seal 78 so that the fill nozzles inserts 82 of the distributor section 16 are open but the outlet orifices 84 remain closed (although not technically sealed to the fuel). This allows an initial lower volume of fuel to prime the fuel lines and burners. The spool 28 will continue to move under the force of the pressurized fuel to the fully open position shown in FIG. 6 in which the outlet orifices are fully open.

When the liquid fuel stop valve is shut and the fuel supply to the valve 10 is de-pressurized, removal of pilot air pressure from the actuator piston 54 will cause the spring loaded spool 28 and the shuttle 70 to return to the open position of FIG. 2, thus completing a full cycle of operation.

Figure 6:
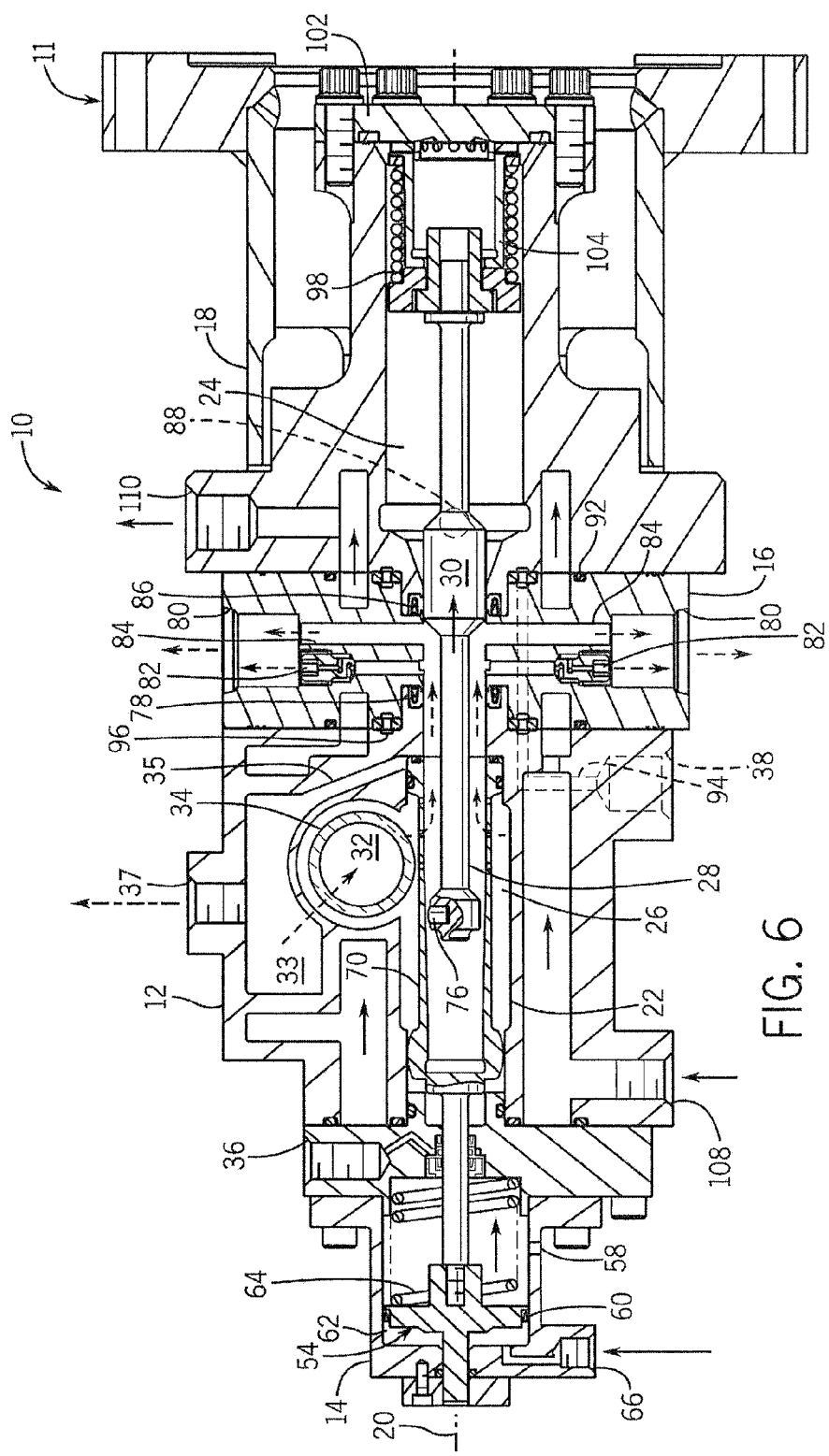
FIG. 6 is a sectional view similar to FIG. 2 showing the valve in a second open position for sustained fuel mode operation.

The dimensions of the valve section 30 of the spool 28 and the strength of the spring 98 are selected such that at typical pressures of the fuel through the fuel inlet 32 and expected pressures of the purging air through purge air inlet port 88, the shuttle 70 and the spool 28 will remain in the fully open position of FIG. 6. Failure of the pilot air supply will not cause a shutting down of the turbine so long as there is fuel pressure. When fuel pressure is also lost, however, the shuttle 70 and the spool 28 will return to the closed position of FIG. 2 sealing the seal 78 and providing an effective check valve against backflow into the fuel inlet 32. The freedom of the spool 28 to move without the influence of the actuator piston 54 allows it to provide both a check valve-type function and with the influence of the actuator piston 54 a pneumatically actuated valve function.

It should be appreciated that merely preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A valve for controlling the flow of liquid fuel in a gas turbine fuel system, the valve comprising:
   a valve housing defining a fuel flow path including a valve chamber, a fuel inlet and a fuel outlet, the valve housing also defining an enclosed fuel reservoir internally within the valve housing and in communication with the valve chamber via an internal passageway;
   a valve member disposed in the valve chamber such that in a closed position the valve member disrupts the flow of fuel from the fuel inlet to the fuel outlet; and
   a shuttle entirely disposed in the valve chamber and movable with respect to the valve member, the shuttle configured to open communication between the valve chamber and the internal passageway to the fuel reservoir when the valve member is in the closed position and to shut-off communication between the valve chamber and the internal passageway when the valve member is in an open position in which fuel can flow from the fuel inlet to the fuel outlet, wherein the shuttle is a sleeve disposed about the valve member having an annular seal for closing off the passageway to the fuel reservoir and having at least one orifice for fuel within the valve chamber to flow to the valve member.

2. The valve of claim 1, wherein the fuel reservoir is vented.

3. The valve of claim 1, wherein the fuel reservoir is defined by the valve housing.

4. The valve of claim 1, wherein the valve housing further defines a cooling circuit between a coolant inlet port and a coolant outlet port for circulating coolant of lesser temperature than the liquid fuel within the valve housing.

5. The valve of claim 4, wherein the coolant circuit runs proximate to the fuel reservoir.

6. The valve of claim 4, wherein the coolant circuit runs proximate to the valve chamber.

7. The valve of claim 1, wherein the shuttle is movable relative to the valve member.

8. The valve of claim 1, further including a pilot air section including a pilot air circuit for moving a piston coupled to the valve member to initiate opening of the valve member.

9. The valve of claim 1, further including a distributor section defining a plurality of fuel outlets.

10. The valve of claim 1, further including a purge air section including a purge air circuit isolated from the fuel inlet by the valve member.

11. The valve of claim 10, wherein the purge air circuit includes the fuel outlet when the valve member is in the closed position.

12. A valve for controlling the flow of liquid fuel and purge air in a gas turbine fuel system, the valve comprising:
   a valve housing defining a fuel circuit and a purge air circuit;
   a first seal disposed in the fuel circuit;
   a second seal disposed in the purge air circuit and spaced from the first seal;
   a valve member disposed within a valve chamber defined by the valve housing operable to seat against each of the first and second seals, in a closed position the valve member seating against the first seal and in an open position the valve member seating against the second seal;
   an enclosed fuel reservoir defined by the valve housing communicating with the fuel circuit; and
   a shut-off member disposed entirely within the valve chamber and operable to shut-off communication between the fuel reservoir and the first seal when the valve member is in the open position.

13. The valve of claim 12, wherein the valve housing defines a cooling circuit for circulating coolant of lesser temperature than fuel within the fuel circuit.

14. The valve of claim 12, wherein the shut-off member is a shuttle sleeve movable with respect to the valve member having an annular seal for closing off an internal passageway to the fuel reservoir.

15. The valve of claim 12, wherein the valve housing defines a pilot air circuit for moving a piston coupled to the shut-off member and the valve member.

16. The valve of claim 12, wherein the valve housing defines a distributor section defining a plurality of fuel outlets.

17. A combined fuel and purge air distributor valve for a gas turbine, comprising:
   a valve housing defining a fuel circuit, a purge air circuit and a distributor section having a plurality of outlet ports, the valve housing also defining an enclosed fuel reservoir internally within the valve housing and in communication with fuel circuit;

a first seal disposed in the fuel circuit;

a second seal disposed in the purge air circuit and spaced from the first seal;

a valve member disposed within a valve chamber defined by the valve housing operable to seat against each of the first and second seals, in a closed position the valve member seating against the first seal to close off communication of the fuel circuit to the outlet ports and in an open position the valve member seating against the second seal to close off flow of the purge air circuit to the outlet ports; and a shut-off member disposed entirely within the valve chamber and operable to shut-off communication between the fuel reservoir and the first seal when the valve member is in the open position.

18. The valve of claim 17, wherein the valve housing defines a cooling circuit for circulating coolant of lesser temperature than fuel within the fuel circuit.

19. The valve of claim 17, wherein the shut-off member is a shuttle sleeve movable with respect to the valve member having an annular seal for closing off an internal passageway to the fuel reservoir.

20. A valve for controlling the flow of liquid fuel in a gas turbine fuel system, the valve comprising:

a valve housing defining a fuel flow path including a valve chamber, a fuel inlet and a fuel outlet, the valve housing also defining an enclosed fuel reservoir internally within the valve housing and in communication with the valve chamber via an internal passageway;

a valve member disposed in the valve chamber such that in a closed position the valve member disrupts the flow of fuel from the fuel inlet to the fuel outlet;

a shuttle entirely disposed in the valve chamber and movable with respect to the valve member, the shuttle configured to open communication between the valve chamber and the internal passageway to the fuel reservoir when the valve member is in the closed position and to shut-off communication between the valve chamber and the internal passageway when the valve member is in an open position in which fuel can flow from the fuel inlet to the fuel outlet; and a purge air section including a purge air circuit isolated from the fuel inlet by the valve member, wherein the purge air circuit includes the fuel outlet when the valve member is in the closed position.

* * * * *